United States Patent Office 3,413,202
Patented Nov. 26, 1968

3,413,202
ELECTROLYSIS OF DI-OLEFINIC COMPOUNDS
Manuel M. Baizer, St. Louis, and James D. Anderson, Bridgeton, Mo., assignors to Monsanto Company, St. Louis, Mo., a corporation of Delaware
No Drawing. Continuation-in-part of application Ser. No. 416,129, Dec. 4, 1964. This application Nov. 24, 1965, Ser. No. 509,618
19 Claims. (Cl. 204—73)

This application is a continuation-in-part of our United States application Ser. No. 416,129 filed Dec. 4, 1964.

The present invention relates to the production of cyclic polyfunctional compounds and more particularly provides a process for electrolytically converting certain compounds containing two activated olefin groups to reduce intramolecularly coupled compounds.

The present process utilizes compounds containing an electron-withdrawing group capable of activating an $\alpha,\beta$-olefinic group toward electrolytic hydrodimerization, and also containing two olefinic groups in $\alpha,\beta$-position with respect to such electron-withdrawing groups. In order to achieve cyclization, the compounds utilized are preferably of size such that the electrolytic intramolecular coupling with ring formation readily occurs, as with 5 to 7 atoms in the chain of atoms constituting the ring, and also readily occurs with 3 or 4 atoms constituting the ring. Compounds suitable for use include those containing two olefinic groups in $\alpha,\beta$-position with respect to carboxylate groups, carboxamide groups, carbonyl groups, nitrile groups, phosphonate groups, phosphinate groups, phosphine oxide groups, sulfone groups, 2-pyridine groups or 4-pyridine groups; the two olefinic groups being connected by a bivalent organic chain, preferably of such length that the $\beta$-carbon atoms of the olefinic groups are separated by 3 to 5 atoms, the said atoms being selected from carbon, oxygen, sulfur and nitrogen; compounds as aforesaid in which the olefinic groups are separated by 1 or 2 of the aforesaid atoms are also very suitable for use in the process, even though the resulting rings might previously have been considered difficult to form. Moreover rings containing up to 10 or more carbon atoms can be formed in the present process, although their production tends to be less efficient. In the production of such compounds the $\beta$-carbon atoms of the olefinic groups will be separated by 1 to 8 or more atoms.

The compounds utilized in the present invention can, for example, have two $\alpha,\beta$-olefinic carboxylate groups, two $\alpha,\beta$-olefinic carboxamide groups, two $\alpha,\beta$-olefinic ketone groups, two $\alpha,\beta$-olefinic aldehyde groups, two $\alpha,\beta$-olefinic nitrile groups, two $\alpha,\beta$-olefinic phosphonate groups, two $\alpha,\beta$-olefinic phosphinate groups, two $\alpha,\beta$-olefinic sulfone groups, two 2-$\alpha,\beta$-olefinic pyridine groups, two 4-$\alpha,\beta$-olefinic pyridine groups, or combinations of any two of the foregoing groups, for example, an $\alpha,\beta$-olefinic nitrile group and an $\alpha,\beta$-olefinic carboxylate group, or an $\alpha,\beta$-olefinic nitrile group and an $\alpha,\beta$-olefinic carboxamide group, or an $\alpha,\beta$-olefinic nitrile group and an $\alpha,\beta$-olefinic ketone group, or an $\alpha,\beta$-olefinic carboxylate group and an $\alpha,\beta$-olefinic ketone group, or an $\alpha,\beta$-olefinic carboxylate group and an $\alpha,\beta$-olefinic carboxamide group, or an $\alpha,\beta$-olefinic nitrile and an $\alpha,\beta$-olefinic phosphonate or an $\alpha,\beta$-olefinic nitrile and an $\alpha,\beta$-olefinic sulfone, or an $\alpha,\beta$-olefinic carboxylate and a 2-$\alpha,\beta$-olefinic pyridine group; the foregoing groups being joined by a bivalent organic radical which is hydrocarbon except for one or more ether, thioether, imino, or carbonyl groups and which may contain arylene groups as well as aliphatic hydrocarbon groups; a formula exemplary of such bivalent organic radicals being

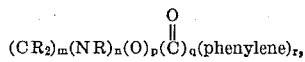

in which $m$ is an integer from 1 to 5, $n$ is an integer from 0 to 2, $p$ is an integer from 0 to 2, $q$ is an integer from 0 to 2, and $r$ is an integer from 0 to 1, and the sum of $m$, $n$, $p$, $q$ and $r$ is from 1 to 8 and preferably 3 to 5 when $r$ is zero, and from 2 to 4 when $r$ is 1, and in which R is hydrogen or lower alkyl, and provided that 0 is not adjacent to NR; designating the divalent connecting radical as Z, some compounds suitable for use and the reaction involved can be represented:

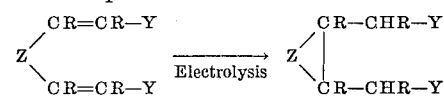

in which Z represents any of the divalent organic radicals included in the above definitions and exemplifications, R represents hydrogen or a hydrocarbyl group containing no non-benzenoid unsaturation or Y and Y represents any of the groups with respect to which the olefinic groups are designated as in the $\alpha,\beta$-position in the compounds designated as suitable hereinabove. The Z will generally be attached to the $\beta$-carbon atoms in accordance with the foregoing representation, but can also be attached between the $\alpha$-carbon atoms to give the following reaction:

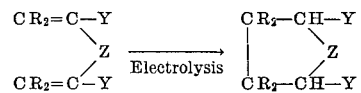

or to the $\alpha$-carbon atom of one moiety and the $\beta$-carbon atom of the second moiety:

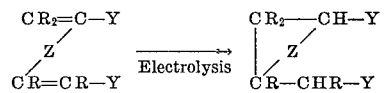

R, Z and Y having the same meaning in all cases although the number of atoms in Z for a given number of atoms in the resulting ring will be less in the latter two cases, as the coupling occurs at the $\beta$-carbon atoms but the $\alpha$-carbon atoms are in the resulting ring when Z is attached to them, making it necessary to have a corresponding change in the number of atoms in Z if the total atoms in the resulting ring are to be the same.

While in the above reactions the olefinic groups are activated by separate electron withdrawing groups, it is also feasible for two olefinic groups to be adjacent to a single such group as represented:

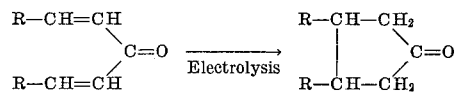

in which R is a hydrocarbyl group.

Some compounds suitable for use in the present process include, for example,

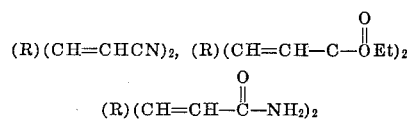

in all of which R represents an alkylene group of at least 3 carbon atoms, and preferably of chain length no greater than 5 carbon atoms;

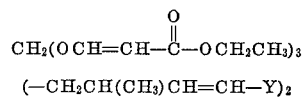

(—CH₂CH(CH₃)CH=CH—Y)₂ in which each Y can be

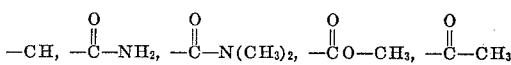

2-pyridyl, 4-pyridyl, —PO(Oethyl), —P(O)CH₃(Oethyl), —P(O)(CH₃)₂, —SO₂, and in which the various alkyl groups in the Y moiety can be individually replaced by other hydrocarbyl groups, usually containing no more than 20 carbon atoms and preferably no more than 10 carbon atoms; (—CH₂NHCH=CH—Y—)₂ in which Y has the same meaning as in the immediate foregoing definition;

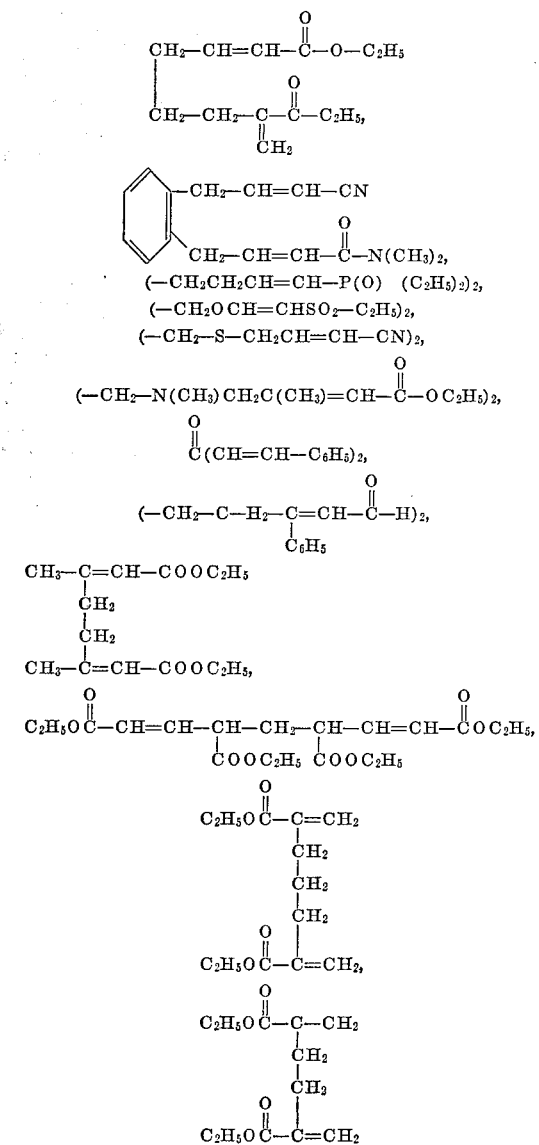

The electrolysis of the foregoing compounds produces reactions in accordance with the present invention to give the corresponding product in which the β-carbon atoms are coupled together by a covalent bond and the α-carbon atoms have an additional hydrogen attached thereto; the coupling of the β-carbons involves the formation of a cyclic structure including the β-carbons and the chain of atoms which linked them together in the starting compound. The formation of such cyclic structures can be accompanied to some extent by reductive couplings between two different molecules of the starting reactants, or by other reductions or side reactions of the starting reactants, depending upon the particular reactants and electrolysis conditions. In addition, some of the moities in the starting reactants which produce the desired cyclic structure may be subject to further reaction during the electrolysis depending somewhat upon the electrolysis conditions, to produce products in which changes in addition to the reductive coupling have occurred; however, such processes are still considered within the present invention so long as the desired reductive coupling to form cyclic compounds has occurred, and in some cases the further reactions or alterations during the electrolysis are actually advantageous in producing particular products.

Some further examples of reactions according to the present invention are illustrated:

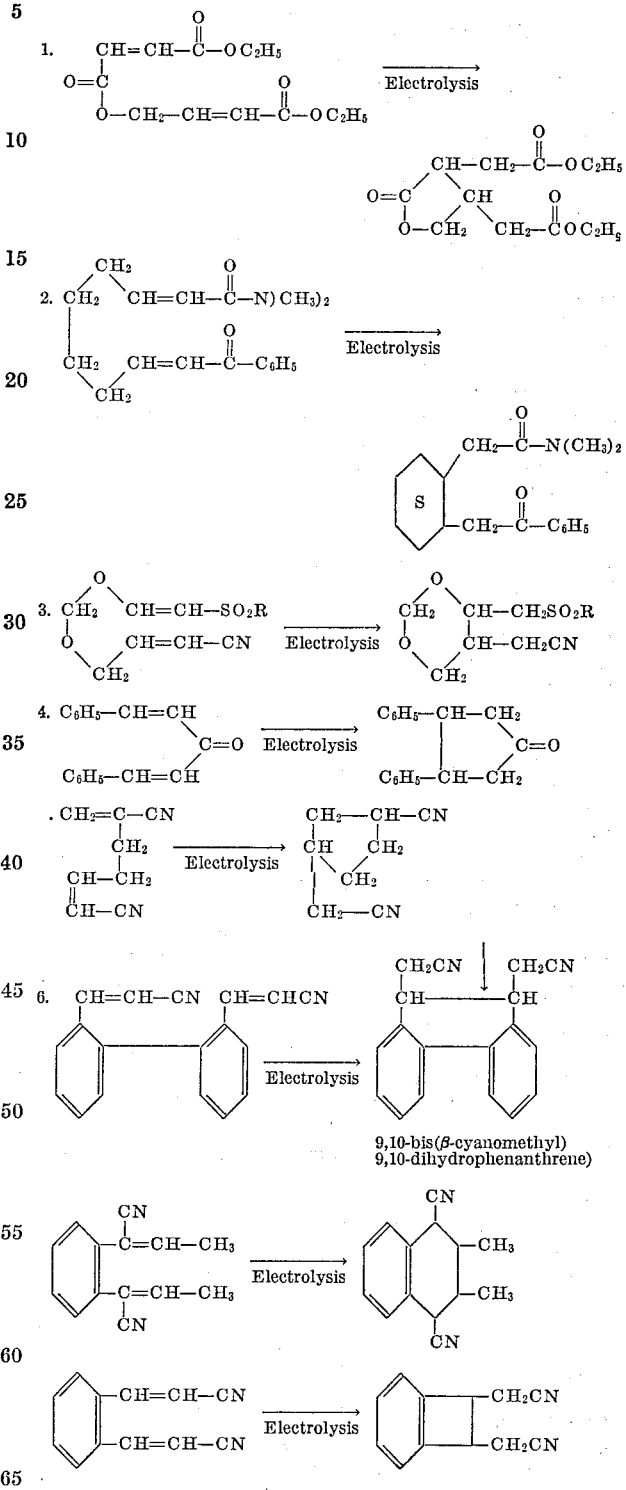

Each of the foregoing reactions is effected by employing the conditions illustrated in the examples set forth hereinbelow.

An object of the present invention is to provide a process for the preparation of cyclic compounds containing various functional compounds. Some of the classes of and individual compounds thus prepared will be known compounds of known reactivities and be useful as intermediates in conducting various reactions or producing other desired compounds.

In general, the electrolytic reductive coupling of the present invention is conducted in concentrated solution in an aqueous electrolyte. It may be desirable to employ fairly concentrated solutions in order to minimize undesired reactions of intermediate ions with the water of the electrolyte. The olefinic reactants will ordinarily comprise at least about 10% by weight of the electrolyte, and preferably at least 20% by weight or more. It is generally desirable to employ fairly high concentrations of salts in the electrolyte, for example constituting 5% and usually 30% or more by weight of the total amount of salt and water in the electrolyte, in order to obtain the desired solubility of the olefinic compounds.

The present process utilizes compounds containing two olefinic groups capable of being reductively coupled by electrolysis at the cathode. The electrolysis conditions to be employed are essentially those taught for hydrodimerizations or other reductive couplings of mono-olefinic compounds in various patents which were copending with the aforesaid Ser. No. 416,429, namely patents concerning such reactions of $\alpha, \beta$-olefinic nitriles, esters and carboxamides such as United States Patents Nos. 3,193,481, 3,193,482, 3,193,483, and 3,193,477, reactions of vinyl pyridine in United States Patent No. 3,218,246 and reactions involving olefinic ketones in United States Patent No. 3,193,479; and in a copending application concerning reactions of $\alpha, \beta$-olefinic phosphonates, phosphinates, phosphine oxides and sulfones, which employ conditions of the foregoing patents, as taught in United States application Ser. No. 255,221 filed Jan. 31, 1963 and now Patent No. 3,249,521. The reaction involved in the present invention is essentially that of the simple hydrodimerizations, except that the reductive coupling occurs between two olefinic groups in the same molecule rather than between olefinic groups in separate molecules.

The salt concentration has an important bearing upon the results obtained. When the salts are hydrotropic, high concentrations contribute to solubility of the olefinic reactants, making it possible to utilize higher concentrations of the reactants. But beyond this, the concentration of salt cations in some way affects the course of the reaction and results in higher yields of reductively cyclized product at the expense of simple reduction products. The process of the present invention is carried out utilizing a supporting electrolyte as understood by those in the art, i.e. electrolyte capable of carrying current but not discharging under the electrolysis conditions, but with the requirement that the supporting electrolyte be a salt. As a practical matter the supporting electrolyte salt should constitute at least 5% by weight of the solution electrolyzed. The requirements of supporting electrolytes are well understood by those skilled in the art and they will be able to select such electrolytes and utilize them in the proper concentrations in view of the teaching herein as to catholyte, and the teaching in the referred-to applications concerning hydrodimerizations of $\alpha, \beta$-olefinic compounds, and salt concentrations essential to such hydrodimerizations. As the intramolecular reductive coupling of O-bis($\beta$-dicarbethoxyvinylamino)benzene, for example, proceeds at the cathode voltages which can vary from, say, about $-1.8$ to about $-1.86$ volts (vs. saturated calomel electrode) depending somewhat upon conditions, any electrolyte salts not subject to substantial discharge at less negative conditions can be employed. Thus, extensive classes of suitable electrolyte salts are available for use. The salts can be organic or inorganic, or mixtures of such, and composed of simple cations and anions or very large complex cations and anions. The term "salts" is employed herein in its generally recognized sense to indicate a compound of a cation and an anion, such as produced by reaction of an acid with a base.

It is preferred that the salts employed herein have the properties of that class of salts recognized as "hydrotropic" i.e. as promoting the solubility of organic compounds in water. Various organic sulfonates, alkyl sulfates, etc., have hydrotropic effects. In this application, any salt which increases the solubility of the olefinic reactants in water is considered hydrotropic.

Some olefinic compounds are subject to polymerization or other side reactions if the electrolyte is acidic, or excessively alkaline, and it will be desirable in such cases to conduct the reductive coupling in solutions which are not overly acidic and also in some cases below a pH at which undesirable side reactions occur, e.g. below about 12. To minimize polymerization, simple reduction of the olefinic bond and other side reactions, the pH is usually maintained in the range of about 3 to about 12, preferably 6 to 9.5. In addition, when the catholyte during electrolysis is acidic, it will generally be advisable to conduct the electrolysis under conditions which inhibit polymerization of the reactants involved or in the presence of a polymerization inhibitor, for example, in an atmosphere containing sufficient oxygen to inhibit the polymerization in question, or in the presence of inhibitors effective for inhibiting free radical polymerization. Classes of inhibitors for inhibiting free radical polymerizations are well known, e.g. such inhibitors as hydroquinone, p-t-butyl catechol, quinone, p-nitrosodimethylaniline, di-t-butyl hydroquinone, 2,5-dihydroxy-1,4-benzoquinone, 1,4-naphthoquinone, chloranil, 9,10-phenanthraquinone, 4-amino-1-naphthol, etc., are suitable. The present process will ordinarily be conducted in the absence of free radical polymerization catalysts or materials which will form polymerization catalysts under the electrolysis conditions, although their presence is not necessarily undesirable if polymerization is sufficiently inhibited or conditions are otherwise such that polymerization will not occur. The inhibitors are ordinarily used in small amounts, e.g. less than 1% by weight based on the olefinic reactant, for example 0.01% by weight based on the olefinic reactant, but can be used in larger amounts such as up to 5% or more by weight, based on the olefinic reactant.

It will be realized that the use of supporting electrolyte salts as taught herein does not ordinarily cause any acidity sufficient to have a great effect upon results, so that consideration of means to counteract acid pH's are ordinarily unnecessary except when acid electrolytes are employed or acids are deliberately added to the catholyte.

In effecting the reductive coupling of the present invention it is preferred to utilize a cathode having an overvoltage greater than that of copper and to subject to electrolysis in contact with such cathode a concentrated solution of the defined olefinic compounds in an aqueous electrolyte under mildly alkaline conditions. It is understood that both the cathode and the anode will be in actual direct physical contact with electrolyte. In effecting the reductive couplings of the present invention, it is essenial to obtain cathode potentials required for such couplings and therefore the salt employed should not contain cations which are discharged at numerically substantially lower, i.e. less negative, cathode potentials. It is desirable that the salt employed have a high degree of water solubility to permit use of very concentrated solutions, for concentrated salt solutions dissolve greater amounts of the organic olefinic compounds.

In addition to the foregoing considerations, a number of other factors are important in selecting salts suitable for good results. For example, it is undesirable that the salt cation form an insoluble hydroxide at the operating pH, or that it discharge on the cathode forming an alloy which substantially changes the hydrogen overvoltage and leads to poorer current efficiencies. The salt anion should not be lost by discharge at the anode with possible formation of by-products. If a cell containing a separating membrane is used, it is desirable to avoid types of anions which, in contact with hydrogen ions present in the anolyte chamber, would form insoluble acids and clog the pores of the membrane. Alternatively, the use of an ion exchange membrane effectively separates catholyte and anolyte and the use of different anions in the two chambers may minimize any difficulties a particular anion would cause in one of the chambers.

In general amine and quaternary ammonium salts are suitable for use in the present process. Certain salts of alkali and alkaline earth metals can also be employed to some extent, although they are more subject to interfering discharge at the cathode and the alkaline earth metal salts in general tend to have poor water solubility, making their use inadvisable.

In carrying out the process of this invention, a solution for electrolysis is prepared by adding the olefinic reactant to an aqueous solution (preferably about 30% or more by weight) of the conducting salt to give a solution which ordinarily contains at least 5% by weight based on the total weight of the solution, of the olefinic reactant in the dissolved state. Depending upon the quantity of salt present and the nature thereof, there may thus be obtained true solutions containing as much as 50% or more by weight of the olefinic reactant. The concentration of olefinic reactant in the dissolved state is to some extent a function of salt concentration; however, at temperatures of above room temperature, i.e. at above, say, 35° C. less of the salt is required to obtain optimum concentration of dissolved olefinic reactant than is required at room temperature. In order to obtain high concentrations of the olefinic reactant in the electrolysis solution when the electrolysis is to be conducted at room temperature, the olefinic reactant is advantageously added to a saturated aqueous solution of the salt. When the electrolysis is to be conducted at a temperature of above room temperature, high concentrations of olefinic reactant can be attained with unsaturated solutions of the salt, i.e., the salt may be as low as 30% by weight of the electrolysis solution. Concentration of the olefinic reactant in the electrolysis solution may also be increased by using a mixture of water and a polar solvent, e.g. acetonitrile, dioxane, ethylene glycol, dimethylformamide, dimethylacetamide, ethanol, or isopropanol, together with the aromatic salt.

Generally in the electrolytic hydrodimerizations of mono-olefinic carboxylates etc., it has been found that it is necessary to utilize fairly concentrated solutions of the olefinic reactants in order to obtain practical yields. In the electrolysis of multi-olefinic compounds according to the present invention, however, it has been found that good yields of the intramolecularly reductively coupled products can be obtained even at low concentrations. This may be because the two olefinic groups to be coupled are in the same molecule and therefore have the same effect as high concentration. Even at low concentrations there does not appear to be any significant competing reaction involving addition of hydrogen ions from the water to the olefin moieties to produce simple reduction products, as is the case in the electrolytic hydrodimerization of mono-olefinic carboxylates, etc. Therefore in the present invention it will be feasible to use low concentrations such as less than 5% by weight, although practical considerations may make concentrations higher than 5% desirable.

In theory the compounds employed in the present invention are also capable of intermolecular couplings, which would presumably be promoted by high concentrations. However, the intermolecular couplings have not been found to occur to any significant degree, and it is possible to achieve very good yields at relatively high concentrations of the olefinic reactant, for example, up to 50% or more by weight of the catholyte. It may be that with some particular olefinic reactants it will be advantageous to consider competing reactions and to use high concentrations to avoid concomitant production of simple reduction products, or to use low concentrations to avoid concomitant production of intermolecular, but it will be within the skill of the art to select conditions suitable for improved yields in view of the present disclosure. Generally it will be desirable to use olefinic concentrations greater than 10% by weight of the catholyte, and concentrations of 20% to 40% by weight of the catholyte will usually be preferred.

During electrolysis in a divided cell, alkalinity increases in the catholyte. However, the anolyte becomes acidic. When a porous diaphragm is used to separate the catholyte from the anolyte, the alkalinity of the catholyte will depend upon the rate of diffusion of acid from the anolyte through the porous barrier. Control of alkalinity in the catholyte, when employing a diaphragm, may thus be realized by purposely leaking acid from the anolyte into the catholyte. It can also be achieved, of course, by extraneous addition to the catholyte of an acid material, e.g. glacial acetic acid, phosphoric acid or p-toluenesulfonic acid. Alkalinity may also be controlled, whether or not a diaphragm is used in the cell, by employing buffer systems of cations which will maintain the pH range while not reacting at the reaction conditions.

When a divided cell is employed, it will often be desirable to use an acid as the anolyte, any acid being suitable, particularly dilute mineral acids such as sulfuric or phosphoric acid. Hydrochloric acid can be employed but would have the disadvantage of generating chlorine at the anode, and of being more corrosive with respect to some anode materials. If desired, a salt solution can be used as anolyte, those useful as catholyte also being suitable as anolyte, although there are many other salt solutions suitable for such use. It will be recognized that the descriptions of the catholyte or olefinic compound solutions herein apply to the solutions, regardless of whether they are in an undivided cell serving as both catholyte and anolyte, or are in the cathode-containing portion of a divided cell. Conversely, when a divided cell is employed, the various descriptions of the catholyte do not necessarily apply to the anolyte, as the olefinic reactant is not ordinarily present in the anolyte and the character of the anolyte is not of primary importance to the hydrodimerization reaction which is occurring in the catholyte. As a practical matter, to obtain good yields in the operation of a continuous process over a matter of days or weeks, it may be necessary to employ a divided cell to avoid or minimize interfering reactions, such as resulting from generation of hydrogen ions at the anode or resulting in deposition of various salt materials on the anode. Moreover, many suitable catholyte salts are subject to degradation if permitted to contact the anode, making it advantageous to employ mineral acids as the anolyte in a divided cell.

The present process can employ current densities of greater than 10 amperes/square decimeter of cathode surface, and the most suitable densities may be in the range of 15 to 20 to 40 or 50 amperes/square decimeter and higher, even up to 100 or more amperes/square decimeter, and it is further possible to use cells having a large effective electrode area, whether in a single set of electrodes or in a series of electrodes. Thus in commercial practice it is probable that individual cells will draw at least 20 to 30 amperes, most likely more than 100 amperes, and cells drawing more than 1000 amperes are contemplated. For reasons of economics and to make practical use of such current densities without necessitating prohibitively high cell voltages, it is essential to have fairly low resistance in the cell as obtainabe by utilizing fairly high concentrations of the electrolyte salt and a relatively narrow gap between the electrodes, e.g. no more than one-half inch, and preferably of the order of one-fourth inch or smaller. Applied voltages of 5 to 20 volts for current densities of 15 to 40 amperes/dm.$^2$ are suitable, and it is preferable, in this range as well as at higher densities that the applied voltage have a numerical value no greater than one-half the numerical value of the current density (in amperes/dm.$^2$). Various power sources are suitable for use in the present invention, particularly any efficient sources of direct current, and, if desired, various known means of varying the applied potential to regulate the current density and the cathode potential can be employed, for example, the means described in Metcalf et al., U.S. Patent No. 2,835,-

631 issued May 20, 1958, the disclosure of which is incorporated herein by reference. If desired alternating current can be superimposed on the direct current applied to the cell.

Materials suitable for constructing the electrolysis cell employed in the present process are well known to those skilled in the art. The electrodes can be of any suitable cathode and anode material. The anode may be of virtually any conductor, although it will usually be advantageous to employ those that are relatively inert or attacked or corroded only slowly by the electrolytes; suitable anodes are, for example, platinum, carbon, gold, nickel, nickel silicide, Duriron, lead and lead-antimony and lead-copper alloys, and alloys of various of the foregoing and other metals.

Any suitable material can be employed as cathode, various metals and alloys being known to the art. It is generally advantageous to employ metals of fairly high hydrogen overvoltage in order to promote current efficiency and minimize generation of hydrogen during the electrolysis. In general it will be desirable to employ cathodes having overvoltages at least about as great as that of copper, as determined in a 2 N sulfuric acid solution at current density of 1 milliamp./square centimeter (Carman, Chemical Constitution and Properties of Engineering Materials, Edward Arnold and Co., London, 1949, page 290). Suitable electrode materials include, for example, mercury, cadmium, tin, zinc, bismuth, lead, graphite, aluminum nickel etc. in general those of higher overvoltage being preferred although those of lower hydrogen overvoltage can also be employed, even if they cause generation of hydrogen under the electrolysis conditions, as is the case with stainless steel and other electrodes of lower hydrogen overvoltage. It will be reaized that overvoltage can vary with the type of surface and prior history of the metal as well as with other factors; therefore the term overvoltage as used herein with respect to copper as a gauge has reference to the overvoltage under the conditions of use in electrolysis.

Among the salts which can be employed according to the invention for obtaining the desired concentration of dissolved olefinic reactant, the amine and quaternary ammonium salts are generally suitable, especially those of sulfonic and alkyl sulfuric acids. Such salts can be the saturated aliphatic amine salts or heterocyclic amine salts, e.g. the mono-, di- or trialkylamine salts, or the mono- di- or tri-alkanolamine salts, or the piperidine, pyrrolidine or morpholine salts, e.g. the ethylamine, dimethylamine or triisopropylamine salts of various acids, especially various sulfonic acids. Especially preferred are aliphatic and heterocyclic quaternary ammonium salts, i.e., the tetraalkylammonium or the tetraalkanolammonium salts or mixed alkyl alkanol ammonium salts such as the alkyltrialkanol ammonium, the dialkyldialkanolammonium, the alkanoltrialkylammonium or the N-heterocyclic N-alkyl ammonium salts of sulfonic or other suitable acids. The saturated aliphatic or heterocyclic quaternary ammonium cations in general have suitably high cathode discharge potentials for use in the present invention and readily form salts hving suitably high water solubility with anions suitable for use in the electrolytes employed in the present invention. The saturated, aliphatic or heterocyclic quaternary ammonium salts are therefore in general well adapted to dissolving high amounts of olefinic compounds in their aqueous solutions and to effecting reductive couplings of such olefinic compounds. It is understood, of course, that it is undesirable that the ammonium groups contain any reactive groups which might interfere to some extent with the reductive coupling reaction. In this connection it should be noted that aromatic unsaturation as such does not interfere as benzyl substituted ammonium cations can be employed; (as also can aryl sulfonate anions).

Among the anions useful in the electrolytes, the aryl and alkaryl sulfonic acids are especially suitable, for example, salts of the following acids: benzenesulfonic acid, o-, m- or p-toluenesulfonic acid, o-, m- or p-ethyl-benzenesulfonic acid, o-, m- or p-cumenesulfonic acid, o-, m- or p-tert-amylbenzenesulfonic acid, o-, m- or p-hexylbenzenesulfonic acid, o-xylene-4-sulfonic acid, p-xylene-2-sulfonic acid, m-xylene-4 or 5 sulfonic acid, mesitylene-2-sulfonic acid, durene-3-sulfonic acid, pentamethylbenzenesulfonic acid, o - dipropylbenzene - 4 - sulfonic acid, alpha- or beta-naphthalene-sulfonic acid, o-, m- or p-biphenylsulfonic acid, and alpha-methyl-beta-napthalenesulfonic acid. Alkali metal salts are useful in the present invention with certain limitations, and the alkali metal salts of such sulfonic acids can be employed, i.e. the sodium, potassium, lithium, cesium or rubidium salts such as sodium benzenesulfonate, potassium p-toluenesulfonate, lithium o-biphenylsulfonate, rubidium beta-naphthalenesulfonate, cesium p-ethylbenzenesulfonate, sodium o-xylene-3-sulfonate, or potassium pentamethylbenzenesulfonate. The salts of such sulfonic acids may also be the saturated, aliphatic amine or heterocyclic amine salts, e.g. the mono-, di- or trialkylamine salts, or the mono-, di- or trialkanolamine salts, or the piperidine, pyrrolidine, or morpholine salts, e.g. the ethylamine, dimethylamine or triisopropylamine salt of benzenesulfonic acid or of o-, p- or m-tuluenesulfonic acid; the isopropanolamine, dibutanolamine or triethanolamine salt of o-, p- or m-toluenesulfonic acid or o-, p- or m-biphenylsulfonic acid, the piperidine salt of alpha- or beta-naphthalenesulfonic acid or of the cumenesulfonic acids; the pyrrolidine salt of o-, m- or p-amylbenzenesulfonate; the morpholine salt of benzenesulfonic acid, of o-, m- or p-toluenesulfonic acid, or of alpha- or beta naphthalenesulfonic acid etc. In general, the sulfonates of any of the ammonium cations disclosed generically or specifically herein can be employed in the present invention. The aliphatic sulfonates are prepared by reaction of the correspondingly substituted ammonium hydroxide with the sulfonic acid or with an acyl halide thereof. For example, by reaction of a sulfonic acid such as p-toluenesulfonic acid with a tetraalkylammonium hydroxide such as tetraethylammonium hydroxide there is obtained tetraethylammonium p-toluenesulfonate, use of which in the presently provided process has been found to give very good results. Other presently useful quaternary ammonium sulfonates are e.g. tetraethylammonium o-, or m-toluenesulfonate or benzenesulfonate; N,N-dimethyl-piperidinium o , m- or p-toluenesulor o-, m- or p-ethylbenzenesulfonate, tetramethylammonium benzenesulfonate, or o-, m- or p-toluenesulfonate; N,N-dimethyl-piperidinium, or o-, m- or p-toluenesulfonate, or o-, m- or p-bi-phenylsulfonate; tetrabutylammonium alpha- or beta-naphthalenesulfonate or o-, m- or p-toluenesulfonate; tetrapropylammonim o-, m- or p-amylbenzenesulfonate or alpha-ethyl-beta-naphthalene sulfonate; tetraethanolammonium o-, m- or p-cumenesulfonate or o-, m- or p-toluenesulfonate; tetra-butanolammonium benzenesulfonate or p-xylene-3-sulfonate; tetrapentylammonium o-, m- or p-toluenesulfonate, or o-, m- or p-hexylbenzenesulfonate, tetrapentanolammoniun p-cymene-3-sulfonate or benzenesulfonate; methyltriethylammonium o-, m- or p-toluenesulfonate or mesitylene - 2 - sulfonate; trimethyl - ethylammonium o-xylene-4-sulfonate or o-, m- or p-toluene-sulfonate; triethylpentylammonium alpha- or beta-naphthalene-sulfonate or o-, m- or p-butylbenzenesulfonate, trimethylethanolammonium benzenesulfonate or o-, m- or p-toluene-sulfonate; N,N-di-ethylpiperidinium or N-methylpyrrolidinium, o-, m- or p-hexylbenzenesulfonate or o-, m- or p-toluene-sulfonate, N.N-di-isopropyl or N,N-dibutylmorpholinium, o-, m- or p-toluenesulfonate or o-, m- or p-biphenylsulfonate, etc.

The tetraalkylammonium salts of the aryl or alkarylsulfonic acids are generally preferred for use as the salt constituents of the electrolysis solution because the electrolyses in the tetraalkylammonium sulfonates are exclusively electrochemical processes. Employing the same concentration of alpha,beta-olefinic compound, the same cathodic voltage, but using the alkali metal sulfonates instead of the tetraalkylammonium sulfonates, yields of intramolecularly coupled products are lower than those obtained with the tetraalkylammonium sulfonates.

Some olefinic reactants are reductively coupled at low negative cathodic voltages, permitting successful results to be obtained with salts of alkali metals. However, in order to insure against interfering reactions it is usually preferred to employ salts of cations which have more strongly negative discharge potentials, e.g. more negative than —2.2 cathodic volts versus the saturated calomel electrode.

Among the ammonium and amine sulfonates useful as electrolytes in the present invention are the alkyl, aralkyl and heterocyclic amine and ammonium sulfonates, in which ordinarily the individual substituents on the nitrogen atom contain no more than 10 atoms, and usually the amine or ammonium radical contains from 3 to 20 carbon atoms. It will be understood, of course, that di- and poly-amines and di- and poly-ammonium radicals are operable and included by the terms amine and ammonium. The sulfonate radical can be from aryl, alkyl, alkaryl or aralkyl sulfonic acids of various molecular weights up to for example 20 carbon atoms, and can include one, two or more sulfonate groups.

Another especially suitable class of salts for use in the present invention are the alkylsulfate salts such as methosulfate salts and ethylsulfate salts, particularly the amine and quaternary ammonium methosulfate and ethylsulfate salts. Methosulfate salts such as the methyltriethylammonium, tri-n-propylmethylammonium, triamylmethylammonium, tri-n-butylmethylammonium, etc., are very hygroscopic and the tri-n-butylmethylammonium in particular forms very concentrated aqueous solutions which dissolve large amounts of organic materials. In general the amine and ammonium cations suitable for use in the alkylsulfate salts are the same as those for the sulfonates, e.g. tetraethylammonium methylsulfate and tetraethylammonium ethylsulfate are very suitable.

Aside from their advantageous properties, suitable methosulfates are readily prepared by reacting ethanolic solutions of dimethylsulfate with trialkyl amines, thereby producing methyltrialkylammonium methosulfates.

Various other cations are suitable for use in the present invention, e.g. tetraalkylphosphonium and trialkyl sulfonium cations, particularly as sulfonate salts formed from sulfonic acids as described above, or as methosulfate salts.

As a further illustration of electrolytes suitable for use in the present invention, the following named salts have all successfully been employed in hydrodimerizations to obtain hydrodimers as the major product with little or no formation of impurities, generally employing concentrated aqueous solutions of the salts containing at least 15% and usually 20 to 40% by weight olefin, and utilizing the general procedures of the illustrative examples herein:

(1) N-trimethyl-N'-trimethylethylenediammonium di-p-toluenesulfonate
(2) Benbyltrimethylammonium p-toluenesulfonate
(3) Methyltri-n-butylphosphonium p-toluenesulfonate
(4) Tetraethylammonium sulfate
(5) Di-tetraethylammonium benzenephosphonate
(6) Trimethylsulfonium p-toluenesulfonate
(7) Methyltri-n-hexylammonium p-toluenesulfonate
(8) Benzyltrimethylammonium phosphate
(9) Benzyltrimethylammonium acetate
(10) Methyltri-n-butylammonium methosulfate
(11) Benzyltrimethylammonium benzoate
(12) Tetraethylammonium methanesulfonate
(13) Benzyltrimethylammonium 2-naphthalenesulfonate
(14) Bis-benzyltrimethylammonium m-benzene disulfonate
(15) Benzyltrimethylammonium thiocyanate
(16) Tetramethylammonium methosulfate Various other quaternary ammonium, tetraalkylphosphonium or trialkylsulfonium salts can be employed in the present process, e.g. the halides, sulfates, phosphates, phosphonates, acetates, and other carboxylic acid salts, benzoates, phosphonates, etc., specifically, for example, tetramethylammonium bromide, tetraethylammonium bromide, tetramethylammonium chloride, tetraalkylphosphonium chloride, tetraethylammonium phosphate, etc., and similarly the alkali, alkaline earth and other metal salts with the foregoing anions can be employed, e.g. sodium chloride, potassium phosphates, sodium acetate, calcium acetate, lithium benzoate, calcium chloride, rubidium bromide, magnesium chloride, as well as the sulfonic acid, particularly aromatic sulfonic acid, and alkylsulfuric acid salts of the foregoing cations and of other alkali, alkaline earth, rare earth and other metals, e.g. cesium, cerium, lanthanum, yttrium, particularly with anions to achieve sufficient water solubility. The aluminum cation is only somewhat inferior to sodium in respect to its discharge potential, but most salts of aluminum tend to hydrolyze in water and precipitate aluminum oxide. It is understood that the solution designated herein as containing salts, electrolytes, etc.; in specified amounts have reference to solutions containing salts sufficiently stable to remain in solution. It will be recognized that many cations are capable of existing in several valence states, and some valence states will be more suitable as supporting electrolytes than others. Other examples of salts which can be employed in the present process, although not necessarily with equivalent or optimum results, are barium bromide, barium acetate, barium propionate, barium adipate, cerium sulfate, cesium chloride, cesium benzoate, cesium benzenesulfonate, potassium oxalate, potassium sulfate, potassium ethyl sulfate, lanthanum acetate, lanthanum benzenesulfonate, sodium sulfate, sodium potassium sulfate, strontium acetate, rubidium sulfate, rubidium benzoate, trisodium phosphate, sodium hydrogen phosphate and sodium bicarbonate.

Solubility will to some extent set an upper limit on salt concentration in the electrolyte solution, although if considered on the basis of water solubility in the salt, fairly low concentrations of water can be employed, but in general there will be at least 5% or so by weight of water or other proton donor present to avoid excessive production of higher polymeric materials, and water will generally constitute more than 15 or 20% by weight of the catholyte.

In conducting the electrolysis process batchwise and on a laboratory scale, the following procedure and apparatus may be employed: the electrolytic cell will comprise a container of material capable of resisting the action of the electrolytes, e.g. glass. Within the container, and serving to divide it into an anode compartment and a cathode compartment may be a diaphragm in the form of a porous cup, e.g. of unglazed porcelain. The anode, which can be of, e.g. platinum or carbon, or any electrode which is inert under the reaction conditions, is immersed in an anolyte contained in the porous cup. The anolyte is an aqueous solution of the salt. When there is employed no diaphragm in the cell, stirring can be employed for pH control. Thereby the anode is subjected to little or no attack; so that the anode can be of substantially any electrode material. An anode comprisnig lead deposited on a copper screen can thus be employed. The cathode, which may be mercury, lead or other metal, and the porous cup, if one is employed, are submerged in the solution of olefinic reactant in the concentrated aqueous salt or a mixture of the same with a polar solvent. The entire cell may be cooled by a jacket containing a coolant, and both the anode and cathode chambers may be equipped with condensers. However, as will be hereinafter shown, the increase of temperature which is produced during electrolysis generally does not result in so much of a decrease in yield that cooling other than with circulating water is economically required. Generally, the electrolysis can, for example, be conducted at a temperature of from, say, less than about 10° C., and up to almost the refluxing temperature of the electrolytic bath and at higher temperatures under pressure. Actually, slightly higher than ordinary ambient temperatures are conducive to improved yields, higher olefin solubilities and lowered electrical resistance. This is to some extent counterbalanced by the tendency of some diaphragm material such as cationic membranes to deteriorate at elevated temperatures, say of 70° C., or the like and the tendency of some compounds to vaporize at higher temperatures. It is generally advantageous to operate in the range of about 40 to about 60° C. Stirring of the solution during the electrolyses, if desired, may be conducted by mechanical or magnetic means. During the electrolysis, the pH of the catholyte may be controlled as hereinbefore described. The quantity of current which is supplied to the cell will vary with the nature and quantity of the bath and of the electrodes and with the operating temperature, but will ordinarily be at a rate greater than 0.5 amperes and in order of a current density of, say, from 2.0 to 20.0 or 40 or more amperes/dm.$^2$ (dm.$^2$ refers to the area in square decimeters of cathode surface). The efficiency of the process is, to some extent, dependent on the current density used. Thus for the efficient production the current density ordinarily should be at least about 5 amperes/dm.$^2$ and practical production rates ordinarily require the use of much higher current densities.

The process conditions are further illustrated by the following examples.

Example 1

A catholyte was prepared by mixing 55 grams bis-1,2-(2-carbethoxyvinyloxy)ethane, 45 grams 80% by weight tetraethylammonium p-toluenesulfonate in water and 50 ml. acetonitrile and the catholyte was charged to an electrolysis cell. The cell was a glass receptacle containing 110 ml. mercury as cathode (about 55 sq. centimeter cathode). An Alundum cup was suspended to its top edge in the catholyte and provided with a 50% by weight solution of tetraethylammonium p-toluenesulfonate in water as anolyte, the Alundum cup serving as a diaphragm to divide the anolyte from the catholyte, and a platinum anode was immersed in the anolyte. Electrolysis was conducted utilizing a source of direct current at a cell voltage of from about 20 to 40 volts at cathode voltage of about −2.07, after an initial electroylsis of impurities at less negative cathode voltage. Electrolysis to effect the desired interamolecular coupling was conducted at a current of 2 amperes for about 5.25 ampere-hours (which would be sufficient to produce about 25.8 grams of the desired product). The catholyte was separated from the mercury, diluted with methylene chloride, washed with water, with the aqueous washings being back extracted with methylene chloride, and dried over sodium sulfate. The methylene chloride as removed by distillation and the residue distilled through a 2-foot Vigreux column, 45 grams of material being obtained in fractions taken from 136° C./0.5 mm. to 190° C./2.2 mm., $n_D^{25}$ 1.4535 to 1.4853, after a forerun of 1.4 grams and leaving 3.6 grams of residue. Vapor phase chromatography of the fractions indicated a high percentage of electrolysis product, along with minor impurities, and some recovered starting material, the recovered starting material being particularly evident in the highest boiling fractions. The fractions distilling at 136° C./0.5 mm. to 150° C./0.65 mm. were combined and redistilled through a 3 foot Todd-Vigreux column, fractions being taken at 112–113° C. at 0.3 mm. $n_D^{25}$ 1.4519 to 1.4520. Vapor phase chromatography indicated 89% electrolysis product in the first fraction and 92 to 96.7% in later fractions. Infrared analysis of the major fraction showed no vinyl unsaturation.

Analysis for 2,3-dicarbethoxymethyl-1,4-dioxane: Calcd. C, 55.38; H, 7.69; M.W. 260. Found C, 54.82; H, 7.70; M.W. 259.

The structure was confirmed by nuclear magnetic resonance analysis. The analysis of recovered organic materials indicated 23 grams of the identified dioxane product was obtained and 23.4 grams of starting material was recovered. The yield base on current input was 89.1%. A sample of the starting bis-1,2-(2-carbethoxyvinyloxy)ethane compound was hydrogenated and found to have a refractive index of 1.4341 and to be more fluid than the electrolysis product and to give different infrared spectra. A mixture of the electrolysis product with the hydrogenation product separated into two peaks by vapor phase chromatography with the silicone grease on Chromasorb W column. None of the straight reduction product was detected in any of the organic fractions from the electrolysis. No linear hydrodimers or similar electrolysis products were detected.

The bis-1,2-(2-carbethoxyvinyloxyethane)compound utilized in the foregoing example was obtained by reaction of ethyl propiolate with ethylene glycol in dioxane with triethylene diamine as catalyst, the glycol and catalyst being added dropwise to the propiolate with cooling; compound from several preparations was combined and utilized, some of it having a boiling point of 155 to 160° C./0.4 mm. and $n_D^{25}$=1.4870, and some of the preparations containing minor impurities.

Example 2

Electrolysis of O-bis(β-dicarbethoxyvinylamino)benzene was conducted employing the electroylsis cell of Example 1. For the catholyte, 40 grams of the compound was used in 104 grams acetonitrile, 28 grams tetraethylammonium p-toluenesulfonate and 12 grams water. As anolyte, a 50% by weight solution of the same sulfonate salt in water was employed. The electrolysis was conducted at a cathode voltage of −1.8 to −1.86 and amperage starting at 2 and being lowered to 1.5 and then 1 toward the end of the electrolysis for a total of 4.74 ampere hours, which is approximately the theory required for ring closure of all the starting compound. The cell voltage had been started at 18 volts, changed to 15 volts toward the end, then 10 volts. The current was continued for 20 minutes additional at a cell voltage of 5 volts, current 0.5 to 0.3 ampere, to make the total 4.87 ampere hours. Acetic acid, 2.4 ml. was added during the electrolysis to control alkalinity. The catholyte was diluted with 200 ml. water, extracted with methylene chloride, the extracts back-washed with water and dried over sodium sulfate. The methylene chloride was removed by distillation over a hot water bath, leaving a dark, oily residue. The residue crystallized on standing overnight. The 38.6 grams of crude product was recrystallized from methanol, three crops being obtained, the first weighing 20.7 grams, M.P. 94–95° C., the second 7.0 grams, M.P. 91–94° C., and the third 7.4 grams with an indefinite melting point. The first two crops were white, crystalline materials. A mixed melting point of a mixture of the first crop with the starting material showed a depression of 20 degrees, illustrating that the materials are different.

Analysis for 3,4-bis(dicarbethoxymethyl)-1,2,3,4-tetrahydroquinoxaline ($C_{22}H_{30}N_2O_8$): Calc'd. C, 58.65; H, 6.71; N, 6.22; M.W. 450. Found C, 58.60; H, 6.73; N, 6.18; M.W. 451.5.

Infrared analysis showed the strong absorption at 1640 cm.$^{-1}$ attributed to the —NH—CH=C (COOC$_2$H$_5$)$_2$ olefinic linkage to be completely lacking in the product. Nuclear magnetic resonance data on the product confirmed the quinoxaline structure of the product, and excluded the structure of simple reduction products by proton count. Attempts to hydrogenate the starting material to obtain a reduction product for comparison were unsuccessful, mild conditions leaving the starting material unchanged, and hydrogenation under pressure causing cleaveage to o-phenylene diamine. The structure of the electrolysis product was further confirmed by pyrolytic decomposition, distillate being collected by heating the product at about 160° C. under high vacuum, and identified as diethyl malonate and quinoxaline by vapor phase chromatography. The compound is thus useful as an intermediate in converting compounds to other known compounds. The compound can also be dehydrogenated to obtain a substituted quinoxaline derivative, and various biological and physiological uses of the compound and its derivatives will occur to those skilled in the art. It will be noted that the foregoing electrolysis, even though it was conducted to virtual complete conversion by utilizing slightly more current than theoretical, gave a crude yield of better than 86%, and no simple reduction products were found even though the latter part of the electrolysis necessarily involved a low concentration of the starting compound. The o-bis($\beta$-dicarbethoxyvinylamino) benzene starting compound was obtained reacting o-phenylene diamine with a two molar portion of diethyl ethoxymethylenemalonate at steam bath temperature; the compound had a melting point of 95–96° C.

Example 3

The procedure of Example 2 was repeated with the cathode voltage maintained about $-1.7$ to $-1.8$, and adding about 2 ml. acetic acid during the electrolysis to control alkalinity. The crude product isolated weighed 39.4 grams and recrystallization from methanol gave three crops, the first weighing 27.3 grams, M.P. 94–95°, and exhibiting no depression in melting point upon admixture with the product of Example 2. The second crop weighed 7.1 grams, M.P. 94–95° C., and the third 3.1 grams, M.P. 81–90° C.

The other electrolyte salts disclosed herein can be substituted for the particular salts utilized in the foregoing examples.

Example 4

A catholyte consisting of 40.0 g. (0.157 mol) of diethyl 2,8-decadiene-1,10-dioate (13% cis, trans and 87% trans, trans isomer distribution), 70.7 g. of acetonitrile, 26.9 g. of tetraethylammonium p-toluenesulfonate (recrystallized from acetone), and 10 ml. water was electrolyzed at $-1.91$ to $-1.96$ v. (vs. saturated calomel electrode) until a total of 4.2 amp.-hrs. were passed. The electrolysis was run at 2 amps. and 25°. The pH was maintained at 7–9 by the dropwise addition of 1.2 ml. of acetic acid. The amount of current passed was sufficient for a 50% conversion of the starting diolefin to cyclic compound. The catholyte was diluted with water and extracted with ether. After drying over magnesium sulfate, the ether was distilled off leaving an organic residue weighing 37.7 g. This material was distilled through a 3-ft. Todd-Vigreux column, the bulk of the diethyl 1,2-cyclohexanediacetate. Infrared analysis of a mixture of the isomers 0.35–0.18 mm. and 102–110° C./0.11 mm. Vapor phase chromatography was employed to obtain samples for analysis free from small amounts of the starting diolefins, one peak being identified as the trans isomer and a second peak as the cis isomer of diethyl 1,2-cyclohexanediacetate. Infrared analysis of a mixture of the isomers showed no unsaturation.

Analysis.—Calcd. for $C_{14}H_{24}O_4$: C, 65.62; H, 9.38; mol. wt., 256. Found: C, 65.78; H, 9.56; mol. wt. (mass spectrograph), 256.

The amount of the cyclic isomers was 18.7 grams for a yield of 90% based on current input. A second electrolysis of the same diolefin was carried out under the same conditions except that it was carried to nearly 100% completion, and a yield of 81% was obtained.

Example 5

The catholyte contained 40.0 g. (0.167 mol) of diethyl 2,7-nonadiene-1,9-dioate (mixture of isomers), 70.7 g. acetonitrile, 26.9 g. tetraethylammonium p-toluenesulfonate, and 10 ml. water. The electrolysis was carried out at 2 amps. and 25° until a total of 4.5 amp.-hrs. were passed. The cathode voltage was $-1.90$ to $-2.00$ v. (vs. saturated calomel electrode) during the run which required the addition of 1.1 ml. acetic acid to moderate the pH. The catholyte was treated in accordance with Example 4 to recover 37.4 grams of organic. Upon distillation the diethyl 1,2-cyclopentanediacetate was obtained principally in fractions at 105–114° C./0.5 mm., and vapor phase chromatography was then employed to separate the product into cis and trans isomers, and to separate it from contaminating amounts of the starting diolefins, which were found mainly in fractions distilling above 108° C. Infrared analysis of a mixture of the isomeric products showed no unsaturation.

Analysis.—Calcd. for $C_{13}H_{22}O_4$: C, 64.42; H, 9.16; mol. wt., 242. Found: C, 64.59; H, 9.24; mol. wt. (mass spectrograph), 242.

The electrolysis produced about 20.7 grams of the diethyl 1,2-cyclopentanediacetate for nearly a thoretical yield based on current input.

Example 6

The catholyte contained 40.0 g. (0.177 mol) of diethyl 2,6-octadiene-1,8-dioate (mixture of isomers), 70.7 g. acetonitrile, 26.9 g. tetraethylammonium p-toluenesulfonate, and 10 ml. water. The electrolysis was carried out at 2–3 amps. and 30° until a total of 7.6 amp.-hrs. were passed. The cathode voltage was $-1.91$ to $-2.08$ v. (vs. saturated calomel electrode) during the run. Three ml. of acetic acid were required to maintain the pH in the desired range. The catholyte was extracted in accordance with the procedure of Example 4 to recover 38.3 grams of organic material. Upon distillation, the diethyl 1,2-cyclobutanediacetate was obtained principally at 79–82° C., and 84–88° C. at 0.12 mm., with some product distilling at slightly higher temperatures. Vapor phase chromatography was employed to further separate the product from some unreacted starting material and diethyl suberate. Infrared analysis of the product which was a mixture of cis and trans isomers showed no unsaturation.

Analysis.—Calcd. for $C_{12}H_{20}O_4$: C, 63.16; H, 8.77; mol. wt., 228. Found: C, 63.35; H, 8.92; mol. wt. (mass spectrograph), 228.

The electrolysis resulted in 13.4 grams of diethyl 1,2-cyclobutanediacetate for a 41% yield based on current input. The electrolysis also produced about 7.9 grams of diethyl suberate.

Example 7

The catholyte contained 40.0 g. (0.149 mol) of diethyl 3,3-diethyl-2,5-heptadiene - 1,7 - dioate (ca. 90% trans, trans isomer), 70.7 g. acetonitrile, 26.9 g. tetraethylammonium p-toluenesulfonate, and 10 ml. water. The electrolysis was carried out at 2 amps. and 25° until a total of 4.7 amp.-hrs. were passed. The cathode voltage was $-1.85$ to $-1.90$ v. (vs. saturated calomel electrode) during the run. Acetic acid, 1.2 ml., was added for pH control. The catholyte was extracted in accordance with the procedure of Example 4 to obtain 36.2 grams of organic material. Distillation gave substantially pure diethyl 3,3-diethyl - 1,2 - cyclopropanediacetate at 118–122° C./0.4 mm., and the same product along with some of the starting diolefin at 124–129° C./0.4 mm. The product was separated into cis and trans isomers by vapor phase chromatography and both isomers had a molecular weight of 270 which is in accord with theory. A sample of the cis isomer had $n_D^{22}$ 1.4480.

Analysis.—Calcd. for $C_{15}H_{26}O_4$: C, 66.67; H, 9.63. Found: C, 66.87; H, 9.74.

The electrolysis produced about 23.4 grams of diethyl 3,3-diethyl-1,2-cyclopropanediacetate for nearly a theoretical yield based on current input.

It will be noted that the above examples demonstrate that the process of the present invention is very suitable for producing small as well as normal ring compounds, the nearly theoretical yield of cyclopropane compound being particularly notable.

The chromatographic separations in Examples 4, 5, 6 and 7 utilized a 3-meter 1% silver nitrate-18% Carbowax 20 M on Chromosorb W column.

The diolefin diesters employed in Examples 4, 5, 6 and 7, are obtainable by dehydrobromination of the corresponding α,α'-dibromodiesters according to the method of (A. Lüttringhaus and H. Merz, Arch. Pharm., vol. 293, 881 in the year 1960).

Example 8

A catholyte composed of 12 grams 1,6-heptadiene-1,3,5,7-tetracarboxylate, 70 grams tetraethylammonium p-toluene-sulfonate, 90 milliliters dimethyl sulfoxide and 30 milliliters water was electrolyzed at circa −1.8 volts (vs. saturated calomel electrode) for 1.67 ampere hours, at which time the cathode voltage became more negative, with an increase in current, and the current was therefore shut off. Methylene chloride was used to extract the product which was then isolated by distillation at 125–128° C./0.2 mm., 5 grams of 1,4-dicarbethoxy-2,3-dicarbethoxy-methylcyclopentane.

*Analysis*—Calcd. for $C_{19}H_{30}O_8$: C, 59.07; H, 7.77. Found: C, 59.25; H, 7.90.

The infrared spectrum was that characteristic of a saturated ester, lacking the absorption at 1650 $cm^{-1}$ exhibited by the starting diolefin. Nuclear magnetic resonance data was consistent with the indicated structure.

The present invention involves an electrolytic procedure for preparation of cyclic compounds. Attempts at electrolytic preparations of cyclic compounds by Kolbe reactions of dicarboxylic acids have generally been unsuccessful, see Svadkovskya and Voitkevich, Russian Chemical Reviews (English translation of Uspesekhi Khimii), page 161 of the volume for the year 1960. In contrast, the present process produces cyclic compounds in good yield and generally with the original functional substituents still present. Among prior art non-electrolytic procedures, the acyloin reaction works well for medium rings but not in the syntheses of small rings, see S. M. McElvain, Organic Reactions, vol. 4, page 256, for the year 1948. In contrast, the present process is very suitable for production of 3- and 4-membered ring compounds.

It will be noted in the above description and examples that steric isomers, particularly cis and trans isomers are frequently present in the products, and may also be present in the starting diolefins. While there will be some variations in the properties of the different steric forms of product, they are useful either as mixtures or in their separated forms. Similarly, the efficiency of the electrolysis may vary somewhat with the steric form of the reactant, but the process is applicable either to mixtures of isomers or to the separated isomers of the disclosed activated di-olefins.

Compounds produced by the present invention which are dioxane derivatives are of interest for antifungal, bactericidal and physiological uses such as those known for other dioxane compounds, and the compounds which are of the quinoxaline type are also of interest for such applications. In addition, the compounds produced by the present invention have a cyclic structure and two reactive functional groups, and it is possible to utilize the functional groups for various types of reactions, e.g. the amide or nitrile groups can be hydrogenated to amine groups, and carboxylate groups for ester exchange reactions. Moreover, the functional groups can be utilized in various resin forming reactions to prepare resins containing cyclic moieties, e.g. the carboxylate groups can be utilized in reactions with glycols to form polyester resins, and the amides groups can be reacted aldheyde to form resins, or reduced to amines and then reacted with aldehydes, and carboxylate groups can be converted to acids and utilized with the compounds containing the amine groups, or various other polyamines, e.g. hexamethylene diamine, to prepare polyamides. Various other uses will be evident to those skilled in the art.

What is claimed is:

1. The method of preparing cyclic compounds by electrolysis which comprises subjecting a solution in aqueous salt electrolyte of olefinic compound containing two olefinic groups capable of reductive coupling by electrolysis, the two olefinic groups being in α,β-position with respect to functional groups selected from the group consisting of carboxylate, carboxamide, carbonyl, nitrile, phosphonate, phosphinate, phosphine oxide, sulfone, 2-pyridine and 4-pyridine groups and the two olefinic groups being bound together by an organic chain, to electrolysis by passing an electric current through said solution in actual physical contact with a cathode, causing development of the cathode potential required to effect reductive coupling, and causing coupling of the compound at the β-position with saturation of the olefinic groups.

2. The method of claim 1 in which the solution comprises water, more than 5% by weight of olefinic compound and at least 5% of supporting electrolyte salt.

3. The method of claim 1 in which the catholyte is non-acidic.

4. The method of claim 1 in which the salt provides a cation discharging at cathode potentials substantially more negative than that at which the reductive coupling is effected.

5. The method of claim 1 in which the salt is selected from the group consisting of quaternary ammonium aromatic sulfonates and quaternary ammonium alkyl sulfates.

6. The method of claim 1 in which a nitrile is employed as functional group.

7. The method of claim 1 in which a carboxylate is employed as functional group.

8. The method of claim 1 in which a carboxamide is employed as functional group.

9. The method of claim 1 in which a carbonyl group is employed as functional group.

10. The method of claim 1 in which the cathode has an overvoltage greater than that of copper and the catholyte solution comprises water, an amount of supporting electrolyte salt above about 30% by weight of the total amount, of water and salt present, more than 10% by weight of olefinic compound and is maintained at a pH in the bulk of the solution of about 7 to about 12.

11. The method of claim 10 in which the supportinkg electrolyte is selected from the group consisting of quaternary ammonium aromatic sulfonates and quaternary ammonium alkyl sulfates.

12. The method of claim 11 in which nitrile is employed as functional group and the β-carbon atoms of the olefinic groups are separated by from 1 to 5 carbon atoms.

13. The method of claim 11 in which a carboxylate group is employed as functional group and the β-carbon atoms of the olefinic groups are separated by from 1 to 5 carbon atoms.

14. The method of claim 11 in which a carboxamide is employed as functional group and the β-carbon atoms of the olefinic groups are separated by from 1 to 5 carbon atoms.

15. The method of claim 11 in which a carbonyl group is employed as functional group and the β-carbon atoms of the olefinic group are separated by from 1 to 5 carbon atoms.

16. The method of claim 1 in which 2,3-dicarbethoxy-methyl-1,4-dioxane is prepared by subjecting a solution in aqueous salt electrolyte of bis-1,2-(2-carbethoxyvinyl-oxy) ethane to electrolysis by passing an electric current through said solution in actual physical contact with a cathode and producing the said 2,3-dicarbethoxymethyl-1,4-dioxane.

17. The method of claim 1 in which 3,4-bis-(discarbethoxymethyl)-1,2,3,4-tetrahydroquinoxaline is prepared by subjecting a solution in aqueous salt electrolyte of o-bis-($\beta$-dicarbethoxyvinylamino)benzene to electrolysis by passing an electric current through said solution in actual physical contact with a cathode and producing the said 3,4-bis-(dicarbethoxymethyl) - 1,2,3,4 - tetrahydroquinoxaline.

18. The method of claim 1 in which the functional groups are carboxylate groups and the $\beta$-carbon atoms are separated by 1 to 4 carbon atoms of an alkylene group.

19. The method of claim 1 in which the olefinic compound is a 1,6-heptadiene-1,3,5,7-tetracarboxylate.

References Cited
UNITED STATES PATENTS

| | | | |
|---|---|---|---|
| 3,193,483 | 7/1965 | Baizer | 204—73 |
| 3,249,521 | 5/1966 | Baizer | 204—73 |

HOWARD S. WILLIAMS, *Primary Examiner.*

H. M. FLOURNOY, *Assistant Examiner.*